Jan. 15, 1929.

L. W. MELCHER 1,699,007

CAR AXLE BEARING

Filed Feb. 7, 1927    2 Sheets-Sheet 1

Jan. 15, 1929.　　　　　　L. W. MELCHER　　　　　1,699,007
CAR AXLE BEARING
Filed Feb. 7, 1927　　　　　2 Sheets-Sheet 2

Inventor
Lee W. Melcher
By Fred Gerlach
his Atty.

Patented Jan. 15, 1929.

1,699,007

UNITED STATES PATENT OFFICE.

LEE W. MELCHER, OF WEST DE PERE, WISCONSIN.

CAR-AXLE BEARING.

Application filed February 7, 1927. Serial No. 166,299.

The invention relates to car axle bearings. One object of the invention is to provide a bearing of the roller type in which provision of an improved character is made for preventing longitudinal movement of the axle relatively to the bearing and enclosing box or casing, so as to prevent wear resulting from relative axial movement between the axle and the box. Another object of the invention is to provide means for efficiently lubricating the bearing between the locking element and the axle. A further object of the invention is to improve the car axle bearing disclosed in an application for Letters Patent filed by me, December 4, 1926, Serial No. 152,547. Other objects will appear hereafter from the detail description.

The invention consists in the several novel features hereinafter set forth and more particularly defined by the claims at the conclusion hereof.

Figure 3:
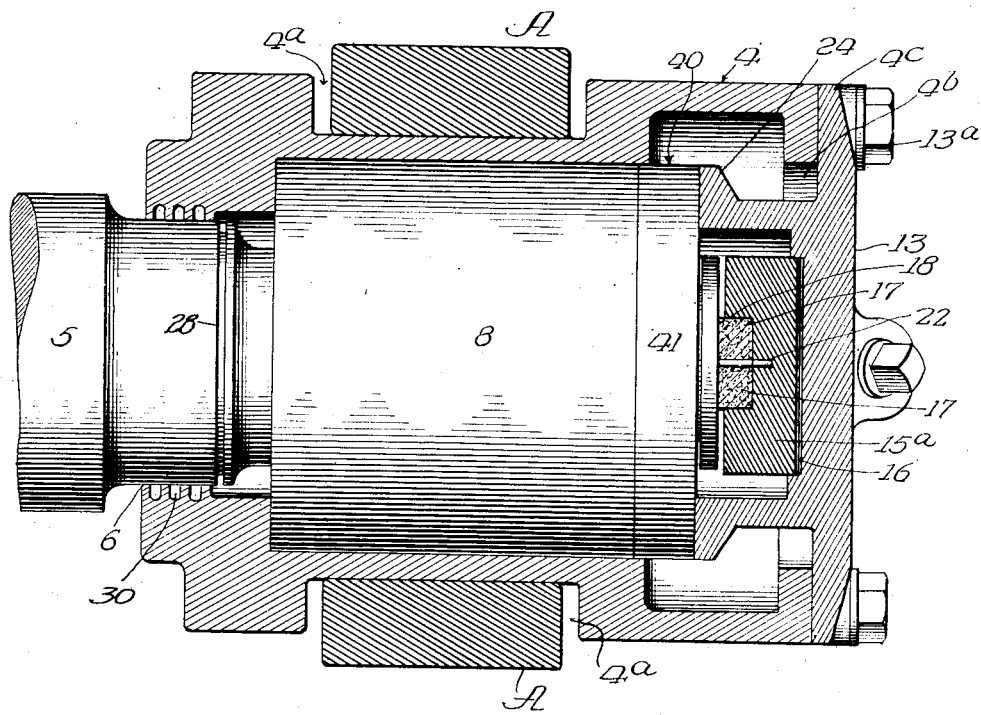
Figure 4:
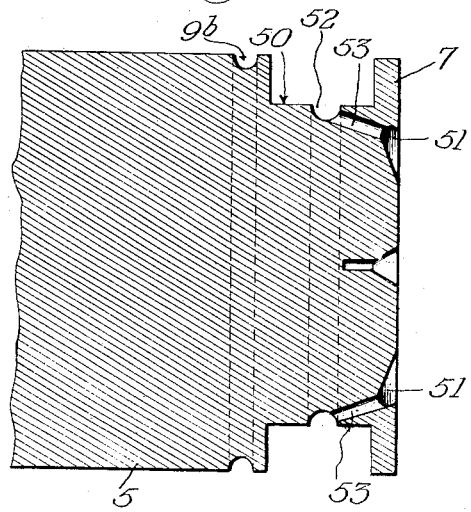

In the drawings: Fig. 1 is a longitudinal section of a device embodying the invention, the axle being shown in elevation. Fig. 2 is a section taken on line 2—2 of Fig. 1. Fig. 3 is a horizontal section taken on line 3—3 of Fig. 1. Fig. 4 is a detail section of one end of the axle.

The invention is exemplified in a structure comprising a box or casing 4 which is guided in a pedestal A which is secured in a truckframe B of any suitable construction. An axle 5 extends through an opening 6 in the inner end of the box and terminates in a transverse face 7 within and near the other end of the box. An outer race or bushing 8 is pressed and fixedly held in a cylindrical seat $8^a$ formed in the box. An inner race or bushing 9 is shrunk and fixedly held on the axle 5 and, if desired, a locking ring $9^a$ for the bushing 9 may be secured in a peripheral groove $9^b$ in the shaft. One or more series of bearing rollers 10 held in cages $10^a$, as well understood in the art, are disposed between said races and constitute a roller bearing for supporting the box from the axle. The outer end of the box has an opening $4^b$ therein of sufficient size to permit the insertion of the roller bearings and the outer race 8. A cap 13, secured by bolts $13^a$, to the end of the box, forms a closure for the outer end of the box.

In practice, when the trucks are equipped with more than four wheels or two axles, as in a six wheel truck, it is necessary to provide for relative axial movement of one of the axles, to permit wheels to follow curves in the rails. In a roller bearing, the axle stresses, if resisted, will cause rapid wear or destruction of the cages and the rollers. For this purpose, the sides of the box 4 are provided with vertical channels $4^a$ for the legs of the pedestal A, and these channels are wider than the legs to permit the box with the axle therein to move axially in the pedestal, to permit the aforesaid relative axial movement of the axles and car-wheels of a truck. Adjacent its outer end, the axle 5 is formed with an annular peripheral groove 50. A ring or member 40, composed of semiannular and complementary sections 41 and 42, has its inner margin formed to fit into the groove 50 in the axle to cause the axle and box to move together axially or to prevent relative axial movement between the axle and the box. This ring is formed of sections, so that it may be inserted in its operative position after the axle has been placed in the box. This ring 40 has its outer periphery extended into the cylindrical seat $8^a$ in the box and its inner face is adapted to abut against the outer end of the race 8. An inwardly projecting member 24, integral with the cover 13, is adapted to abut against the outer face of ring 40 so it will be confined against longitudinal movement in the box. To insert the ring 40 into its operative position in the groove 50 in the axle, the upper section 41, while inverted, is placed into the lower portion of the box, as indicated by dotted lines in Fig. 3 and slipped under the groove 50; then it is lifted into engagement with the groove and rotated around the axle into its operative position until it is disposed in the upper arc of the groove. Next, the lower section 42 is placed in the lower portion of the box in the position indicated in dotted lines in Fig. 3 and raised into the groove 50 and pushed backwardly into the seat $8^a$ in the box. The member 24 of the cover 13, which serves as a holder for the ring, is provided with a stud $24^a$ which is adapted to enter a hole $24^b$ in the section 41, so that the sections will be properly positioned. The sections are each provided with a hole $24^b$ so that they may be interchangeably used and so that there will always be a hole in the lower section through which oil may pass as hereinafter set forth.

An oil well 11 is formed in the lower portion of, and extends from, end to end of the box, and includes a longitudinal duct 12 through the wall which carries the race $8^a$, so that oil will return from the flow from the inner end of the box to its outer end. A circular thrust block 15, usually of brass, is secured by a bolt 15ᵃ in a recess 16 formed in the inner face of the cover 13 and is normally spaced a slight distance away from the end face 7 of the axle. This block carries a vertically extending wick 17 and has its inner face formed with an opening 18 to expose the portion of a wick contiguous to the central portion of the end face 7 of the axle. This opening is formed in the central portion of the thrust block so the wick will apply oil to the central portion of the axle end and to leave the outer portion of said end face free, so that oil may travel outwardly away from the wick under the influence of centrifugal force. The lower end of the wick extends into the well 11 to continuously feed oil by capillary attraction to the end face of the axle. The wick, above and below its exposed portion in the opening 18, is contained in the outwardly inclined upper and lower openings 20 and 21 in block 15. A pin 22, carried by said block, extends into the wick to hold it against displacement by the rotating axle, the end of the pin being recessed to avoid engagement of the pin. The wall 24, which extends to form an abutment for the holder ring 40, extends around the block, and the wick 17 extends through a hole 24ᶜ in said wall. An annular groove 51 is formed in the end face 7 of the axle, outwardly of the central portion of the axle to which lubricant is applied by the wick 17. An annular oil groove 52 is also formed in the base of the groove 50 in the axle. Inwardly and outwardly inclined ducts 53 lead from the groove 51 to the groove 52, so that the oil moving outwardly on the end face 7 of the axle, under the influence of centrifugal force, will pass into groove 51 and then flow, still under the influence of said force, into the groove 52 which will deliver the oil to the inner periphery of the ring 40 to lubricate the contacting surfaces between the ring and the axle. Oil will escape from the faces of the ring. The portion escaping from the inner face will be directed by the ring to the lower portion of the roller bearing. That portion of the oil escaping at the outer face of the ring will be caught by the annular wall 24 and directed by an inclined formation 24ᵈ into the hole 24ᵇ in the lower section 42 of the holder ring 40 through which it will flow to the outer end of the roller bearing. The axle adjacent the inner end of the box may, if desired, be provided with an annular groove 28 to prevent its inward longitudinal movement along the axle and cause it to be projected by centrifugal force into the inner end of the box, from which it will flow back into the oil well 11. The usual oil and dust seal 30 is provided at the inner end of the box. The cover 13 is provided with a filler plug 32.

The operation will be as follows: When it is necessary for one axle and the wheels thereon to move laterally relatively to the other axles on a truck, the box 4 will slide longitudinally through the pedestal A, the movement of the box with the axle being effected by the ring 40 in the groove 50 in the axle. This avoids longitudinal or sliding stresses between the rollers and the races secured to the axle and box respectively. During the rotation of the axle, the wick 17 will supply oil from the well 11 by capillary attraction to the portion in the opening 18 in the thrust block 15, so that oil will be applied to the central portion of the rotating axle. Centrifugal force will cause this oil to flow or be thrust outwardly on the end face 7 of the axle and into the groove 51 therein. From this groove, the oil will flow through ports 53 to the groove 52 to lubricate the bearing surfaces between the ring 40 and the axle. After lubricating these surfaces, the oil will flow at the inner and outer faces of the ring to the outer end of the roller bearing. The rollers will work the oil longitudinally to the inner end of the box where it will flow back into the oil well for recirculation. As the oil circulates in this manner, it is cleansed or filtered in passing through the wick which retards any particles of metal or foreign matter which may reach the oil well. The volume of the oil delivered to the bearing is controlled by the capacity of the wick independently of the speed of the axle.

The invention exemplifies a car axle bearing of the roller bearing type in which the box is caused to move longitudinally axially in both directions with the axle, and is free to so move in the pedestal or truck-frame; thus avoiding the wear and destructive influences which result from relative axial movement between the rollers and the races in the box and on the axle respectively. The invention also provides a lubricating system by which oil is circulated to successively lubricate the surfaces between the elements which effect substantial unison in axial movement of the axle and the box and the roller bearings to prevent wear and reduce friction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a car-truck frame, of a box provided with a wall forming a cylindrical seat and a removable cover at one end, an axle extending into the other end of the box provided with an annular groove adjacent its enclosed end, a roller bearing between the shaft and said seat, a connection between the frame and the box which permits the box to move back and forth in the truck, means for retaining the box and axle against relative axial movement comprising a ring fitting within the seat and extending into said groove, said ring being retained by the cover against outward axial movement, and a stud between the cover and ring for positioning the latter.

2. The combination of a box having an oil well in its lower portion, an axle extending into and terminating in the box, a roller bearing between the axle and the box, means to deliver oil from the well to the central portion of the end face of the axle, the outer portion of said face being free to permit the oil to move outwardly by centrifugal force, means inwardly of said end-face to retain the axle and the box against relative axial movement, and means for delivering oil from the end-face of the axle to the surfaces between the retaining means and the axle.

3. The combination of a box having an oil well in its lower portion, an axle extending into and terminating in the box, a roller bearing between the axle and the box, means to deliver oil from the well to the central portion of the end face of the axle, the outer portion of said face being free to permit the oil to move outwardly by centrifugal force, means inwardly of said end-face to retain the axle and the box against relative axial movement, means for delivering oil from the end-face of the axle to the surfaces between the retaining means and the axle, and means to conduct the oil from said surfaces to the roller-bearing.

4. The combination of a box having an oil well in its lower portion, an axle extending into and terminating in the box, a roller bearing between the axle and the box, a wick to deliver oil from the well to the central portion of the end face of the axle, the outer portion of said face being free to permit the oil to move outwardly by centrifugal force, means adjacent said end face of the axle to retain the axle and the box against relative axial movement, and means for delivering oil from the end face of the axle to the surfaces between the retaining-means and the axle.

5. The combination of a box having an oil well in its lower portion, an axle extending into and terminating in the box, a roller bearing between the axle and the box, a wick to deliver oil from the well to the central portion of the end-face of the axle, the outer portion of said face being free to permit the oil to move outwardly by centrifugal force, means adjacent said end-face of the axle to retain the axle and the box against relative axial movement, means for delivering oil from the end face of the axle to the surfaces between the retaining-means and the axle, and means to conduct the oil from said surfaces to the roller-bearing.

6. The combination of a box having an oil well in its lower portion, an axle extending into and terminating in the box, a roller-bearing between the axle and the box, a wick to deliver oil from the well to the central portion of the end-face of the axle, the outer portion of said face being free to permit the oil to move outwardly by centrifugal force, means adjacent said end-face of the axle to retain the axle and the box against relative axial movement, means for delivering oil from the end-face of the axle to the surfaces between the retaining-means and the axle, comprising a groove in the end face of the axle, and a duct between said groove and said surfaces.

7. The combination of a box having an oil well in its lower portion, an axle extending into and terminating in the box, a roller-bearing between the axle and the box, a wick to deliver oil from the well to the central portion of the end-face of the axle, the outer portion of said face being free to permit the oil to move outwardly by centrifugal force, means adjacent said end-face of the axle to retain the axle and the box against relative axial movement, means for delivering oil from the end-face of the axle to the surfaces between the retaining-means and the axle, comprising a groove in the end-face of the axle, an annular groove in the axle at the retaining means, and means to deliver oil from the groove in the end-face to the peripheral groove.

8. The combination of a box having an oil well in its lower portion, an axle extending into and terminating in the box, and provided with an annular groove adjacent its enclosed end, a roller-bearing between the axle and the box, a wick to deliver oil from the well to the central portion of the end-face of the axle, the outer portion of said face being free to permit the oil to move outwardly by centrifugal force, means extended into said groove to retain the axle and the box against relative axial movement, and means for delivering oil from the end-face of the axle to said groove.

9. The combination of a box having an oil well in its lower portion, an axle extending into and terminating in the box, and provided with an annular groove adjacent its enclosed end, a roller-bearing between the axle and the box, a wick to deliver oil from the well to the central portion of the end-face of the axle, the outer portion of said face being free to permit the oil to move outwardly by centrifugal force, means extended into said groove to retain the axle and the box against relative axial movement, means for delivering oil from the end-face of the axle to said groove, comprising an annular groove in the end-face of the axle, an annular oil groove in the base of the retaining groove in the axle, and ducts between said grooves through which the oil is carried by centrifugal force.

10. The combination of a box having an oil well in its lower portion, an axle extending into and terminating in the box, a roller bearing between the axle and the box, means for conducting oil from the well to the end face of the axle so it will be thrown outwardly by centrifugal force, means inwardly of said end face to retain the axle and the box against relative axial movement, and means for delivering oil from the end face of the axle to the surfaces between the retaining means and the axle.

Signed at Chicago, Illinois, this 3rd day of January, 1927.

LEE W. MELCHER.